US 11,193,600 B2

(12) United States Patent
Wang et al.

(10) Patent No.: US 11,193,600 B2
(45) Date of Patent: Dec. 7, 2021

(54) ULTRA-LOW CARRYOVER SOLENOID VALVE

(71) Applicant: Parker-Hannifin Corporation, Cleveland, OH (US)

(72) Inventors: Yong Wang, Wayne, NJ (US); Leonard Prais, Pompton Lakes, NJ (US); Donald Purcell, Harvard, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 177 days.

(21) Appl. No.: 16/340,426

(22) PCT Filed: Nov. 8, 2017

(86) PCT No.: PCT/US2017/060511
§ 371 (c)(1),
(2) Date: Apr. 9, 2019

(87) PCT Pub. No.: WO2018/097963
PCT Pub. Date: May 31, 2018

(65) Prior Publication Data
US 2019/0234522 A1    Aug. 1, 2019

Related U.S. Application Data

(60) Provisional application No. 62/425,198, filed on Nov. 22, 2016.

(51) Int. Cl.
*F16K 11/24* (2006.01)
*F16K 31/06* (2006.01)
(Continued)

(52) U.S. Cl.
CPC .............. *F16K 11/24* (2013.01); *F16K 11/22* (2013.01); *F16K 31/0634* (2013.01);
(Continued)

(58) Field of Classification Search
CPC .......... F16K 11/22; F16K 11/24; F16K 11/20; F16K 11/10; F16K 31/0634; Y10T 137/5987
See application file for complete search history.

(56) References Cited

U.S. PATENT DOCUMENTS 2,768,790 A * 10/1956 Frey ...................... D06F 39/088
236/12.21
2,768,791 A * 10/1956 Frey ...................... D06F 39/088
236/12.21
(Continued)

FOREIGN PATENT DOCUMENTS

DE    102013113673 A    6/2015

OTHER PUBLICATIONS

Translation of DE102013113673A published Jun. 11, 2015 cited on IDS Apr. 9, 2019.*
(Continued)

*Primary Examiner* — Craig M Schneider
*Assistant Examiner* — Christopher D Ballman
(74) *Attorney, Agent, or Firm* — Renner, Otto, Boisselle & Sklar, LLP (57) ABSTRACT

A solenoid valve system includes a valve body defining porting for a fluid flow through the valve body, and first and second solenoid valve components attached oppositely to the valve body. Each valve component includes an electromagnetically driven armature with a poppet that moves between a closed position and an open position. The porting defined by the valve body includes first side porting, second side porting, and common porting in fluid communication with an internal common chamber defined by the valve body. When a respective poppet is in the closed position, flow of fluid is blocked between the respective side porting and the common porting, and when the respective poppet is in the open position the poppet permits a flow of fluid (Continued)

between the respective side porting and the common porting through the common chamber.

14 Claims, 5 Drawing Sheets

(51) Int. Cl.
  *F16K 11/22* (2006.01)
  *F16K 11/20* (2006.01)
  *F16K 11/10* (2006.01)
(52) U.S. Cl.
  CPC ............... *F16K 11/10* (2013.01); *F16K 11/20* (2013.01); *Y10T 137/5987* (2015.04)

(56) References Cited

U.S. PATENT DOCUMENTS

| | | | | |
|---|---|---|---|---|
| 2,844,320 | A * | 7/1958 | Paule | D06F 39/045 |
| | | | | 236/12.12 |
| 2,967,545 | A * | 1/1961 | Schmidt | F16K 31/0613 |
| | | | | 137/625.65 |
| 3,021,868 | A | 2/1962 | William | |
| 3,799,203 | A * | 3/1974 | Doutt | F16K 31/0634 |
| | | | | 137/625.65 |
| 3,942,553 | A * | 3/1976 | Gallatin | F15B 11/0426 |
| | | | | 137/599.07 |
| 4,846,226 | A * | 7/1989 | Merritt | B05B 12/149 |
| | | | | 137/871 |
| 4,860,792 | A * | 8/1989 | Ichihashi | F15B 13/0402 |
| | | | | 137/596.17 |
| 4,903,727 | A * | 2/1990 | Motzer | F15B 20/001 |
| | | | | 137/596.16 |
| 5,361,802 | A | 11/1994 | Kroll et al. | |
| 5,469,885 | A * | 11/1995 | Nishimura | F16K 11/22 |
| | | | | 137/565.23 |
| 6,273,122 | B1 * | 8/2001 | Schudt | F16H 61/0009 |
| | | | | 137/15.09 |
| 6,561,221 | B1 * | 5/2003 | Kurz | F15B 13/0402 |
| | | | | 137/596.17 |
| 7,721,760 | B2 * | 5/2010 | Hettinger | F16K 31/0606 |
| | | | | 137/596.17 |
| 8,561,644 | B2 * | 10/2013 | Schultz | A01J 5/14 |
| | | | | 137/625.65 |
| 8,991,431 | B2 * | 3/2015 | Zhou | F16K 11/22 |
| | | | | 137/883 |
| 9,249,895 | B2 | 2/2016 | Hettinger et al. | |
| 9,482,360 | B2 | 11/2016 | Bantz et al. | |
| 9,551,431 | B2 * | 1/2017 | Yang | H01J 49/0422 |
| 9,645,585 | B2 * | 5/2017 | Nguyen | F16K 11/24 |
| 9,903,396 | B2 * | 2/2018 | Brinkman | F15B 13/0832 |
| 10,613,553 | B2 * | 4/2020 | van der Merwe | F04B 49/22 |
| 10,859,175 | B2 * | 12/2020 | Tanaka | F15B 13/0402 |
| 2006/0255306 | A1 | 11/2006 | Scheibe | |
| 2009/0078900 | A1 * | 3/2009 | Smith | F16K 31/0675 |
| | | | | 251/129.15 |

OTHER PUBLICATIONS

International Search Report and Written Opinion of PCT/US2017/060511 dated Feb. 15, 2018.

* cited by examiner

ULTRA-LOW CARRYOVER SOLENOID VALVE

RELATED APPLICATIONS

This application is a national stage application pursuant to 35 U.S.C. § 371 of PCT/US2017/060511 filed on Nov. 8, 2017, which claims the benefit of U.S. Provisional Application No. 62/425,198 filed Nov. 22, 2016, the contents of which are incorporated herein by reference.

FIELD OF INVENTION

The present invention relates generally to solenoid actuator valves, and more particularly to solenoid actuator valves for use in applications requiring low carryover, least dead volume, smallest internal volume, compact size and a latching function, such as for example in life science, medical, and analytical chemistry applications.

BACKGROUND OF THE INVENTION

Low carryover valves are used in a variety of applications. For example, clinical laboratories and hospitals utilize various diagnostic apparatuses to analyze patient medical samples, such as blood, urine, other fluids, and tissues. Because it is desirable for such apparatuses to be as compact as practicable, the size of the valves remains a concern, but with reduced size sufficient valve speed and efficiency needs to be maintained. Solenoid valves with an electromagnetically driven actuator may be employed to control fluid flow in such applications.

Accordingly, there is a growing need of customers in the clinical, analytical and agent detection markets to reduce instrument size and complexity while increasing sample throughput at a reduced cost. Users have expressed a growing desire to reduce the size of fluid paths to decrease the use of expensive reagents. Systems using smaller bore tubing to accomplish this result typically require higher system pressures to deliver the needed flowrates. Reduced system volume combined with the desire to process samples faster results in low carryover. In addition, users also prefer to have valves mounted adjacent to each other or in close proximity to maintain a compact footprint, and desire smaller valve widths to allow for reduction in manifold size, which contributes to decreasing the overall instrument size.

One common valve system configuration is a 3-way valve configuration, including two individual solenoid valve components mounted in an adjacent positioning. Each individual solenoid valve may include a flow passage, with each such individual flow passage having an output port in fluid communication with a common port of a common flow passage though the 3-way valve system. Under certain circumstances, each valve component may be operated individually, i.e., one of the individual solenoid valve components is open while the other of the individual solenoid valve components is closed. In addition, it is often desirable to switch as between operation of the two solenoid valve components. To accomplish such switched valve operation, any present fluids (e.g., samples, reagent solutions, etc.) need to be flushed out for a subsequent usage. To achieve high efficiency in the referenced compact footprint, minimizing time between subsequent usages has become a significant issue. In addition, large dead spaces can be present for fluid accumulation, which can result in wasted reagent and areas that are difficult to flush.

A measure of efficiency for switching between flow through the individual valve components is commonly referred to in the art as "carryover performance". From a valve perspective, the high pressure and flowrates, along with a compact size of the fluid passages and overall system, translates to a need to generate low carryover time operated under such conditions of relative higher pressure with a compact size and multiple valve components. According to industry standards, carryover performance has been defined as a valve's ability to quickly change from flow of a first fluid to flow of a second fluid, while minimizing the amount of residual fluid from the first fluid. Carryover performance is of primary concern for clinical and analytical applications where the valve system is responsible for directing fluids to a chemical reaction, which requires precise volumes and/or concentrations of each fluid with minimal waste fluid.

SUMMARY OF THE INVENTION

Aspects of the present invention relate to a 3-way solenoid valve system including two individual solenoid valve components mounted together to form a common manifold. Each individual solenoid valve component may operate independently of the other to open and close a respective flow passage, with each such individual flow passage having a fluid port in fluid communication with a common port though the 3-way valve system. The present invention provides for a solenoid valve system with a compact size and footprint (e.g., 9 mm or less in a minor or short axis direction) that uniquely delivers enhanced carryover performance (i.e., low carryover time) in combination with high pressures and flow rates, and with a 3-way way shutoff capability.

In exemplary embodiments, to achieve enhanced carryover performance, a smaller internal chamber volume with minimized dead space within the flow passages has been designed as compared to conventional configurations. For achieving the narrow footprint, the valve system may be configured with oval shape solenoids with an enhanced latching mechanism to provide for a bistable operation of each individual solenoid valve component between open and closed positions. To further achieve the shutoff functionality, two electromagnetically driven poppets may be used, one each for each individual solenoid valve component.

The configuration of the present invention achieves a smaller internal volume as compared to conventional configurations, with tubular flow passages having minimal pockets and cavities that may constitute dead space for residual fluid build-up. For a 3-way valve system, three ports including two side ports and a common port may meet generally at a common chamber in a center portion of a valve body that links the individual solenoid valve components. The two side ports may have elastomer poppet seals, which are close to the center of the 3-way valve system in the area of the common chamber. As used herein, the "common" chamber may include the intersection area of under seat volumes of the two side ports and the common port. The common chamber may be configured having generally a "T" geometry shape. Valve seats formed of the side port passages of the valve body may be configured having a cone shape with about a 45° surface inclination, and the poppets may act as sealing elements positioned as close as is practicable to the intersection of the ports at the common chamber.

With such configuration, for one of the open solenoid valve components the intersection of open flow passages may be configured nearly as an "L" shape when another poppet seal closes the other solenoid valve component. Such configuration dramatically reduces dead volume, and residual fluid in the common chamber and common port can be very easily flushed out, as required when switching different fluids and flow directions. Example flow switching may include first side port→common port to second side port→common port; or common port→first side port to common port→second side port (and reverse of those). For a 2-way valve operation, which basically is a half of the 3-way valve system structure with one of the individual solenoid valves closed off, the flow passage inside the valve system may be configured as a bended tube "Π" shape to reduce dead area to flush the whole common chamber cleanly.

In exemplary embodiments, the 3-way valve system has mirror imaged opposing twin identical solenoids with a latching function, and the twin identical solenoids may be operated independently. Each individual solenoid valve component may include Applicant's patented oval-coil shape, described in U.S. Pat. No. 9,482,360 which is incorporated here by reference, and a latching mechanism utilizing a permanent magnetic ring (PM-ring). The PM-ring may be embedded in the coil frame, which is made of a soft magnetic material and is thus configured as part of the coil magnetic flux loop. The magnetic pole axis of the PM-ring may be specified parallel to the magnetic flux in the coil frame, and the PM ring is designed to be located close to the armature. The valve can be operated via a special valve driver to have different combination functions, e.g. a normally closed 3-way, or two 2-way valves, or others, since each solenoid can be piloted independently.

The latching feature for each individual solenoid valve component may provide for a bistable operation, by which the armature poppet maintains either in the open or closed position without a need for continued supply of power. In an example of bistable operation, a solenoid valve component may be retained in a closed position by relying on a biasing spring force, and/or maintained in the open position by relying on the PM-ring magnetic force without an electric power input. Changing armature poppet positions could be executed by energizing the coil and applying different electric current flow directions. Due to the solenoid being capable of sustaining a bistable position to carry on application tasks without a supply of power, power consumption of the valve is dramatically reduced.

An aspect of the invention, therefore, is an enhanced solenoid valve system that includes a valve body defining porting for a fluid flow through the valve body, and first and second solenoid valve components attached oppositely to the valve body. In exemplary embodiments of the valve system, each valve component includes an electromagnetically driven armature with a poppet that moves between a closed position and an open position. The porting defined by the valve body includes first side porting, second side porting, and common porting in fluid communication with an internal common chamber defined by the valve body. When a respective poppet is in the closed position, flow of fluid is blocked between the respective side porting and the common porting, and when the respective poppet is in the open position the poppet permits a flow of fluid between the respective side porting and the common porting through the common chamber. Such configuration reduces carryover performance time while maintaining a compact footprint with high pressures and flow rates.

The valve body may have a central valve seat against which the poppets interact when in the closed position. The central valve seat may be cone shaped. Each of the first and second valve components further may include a latching mechanism that maintains the armature in a bistable manner in either of the first position or the second position. The latching mechanism may include a spring that biases the armature with the poppet in the closed position, and a permanent magnetic (PM) element that retains the armature with the poppet in the open position, without a supply of power to the solenoid coil.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 1:
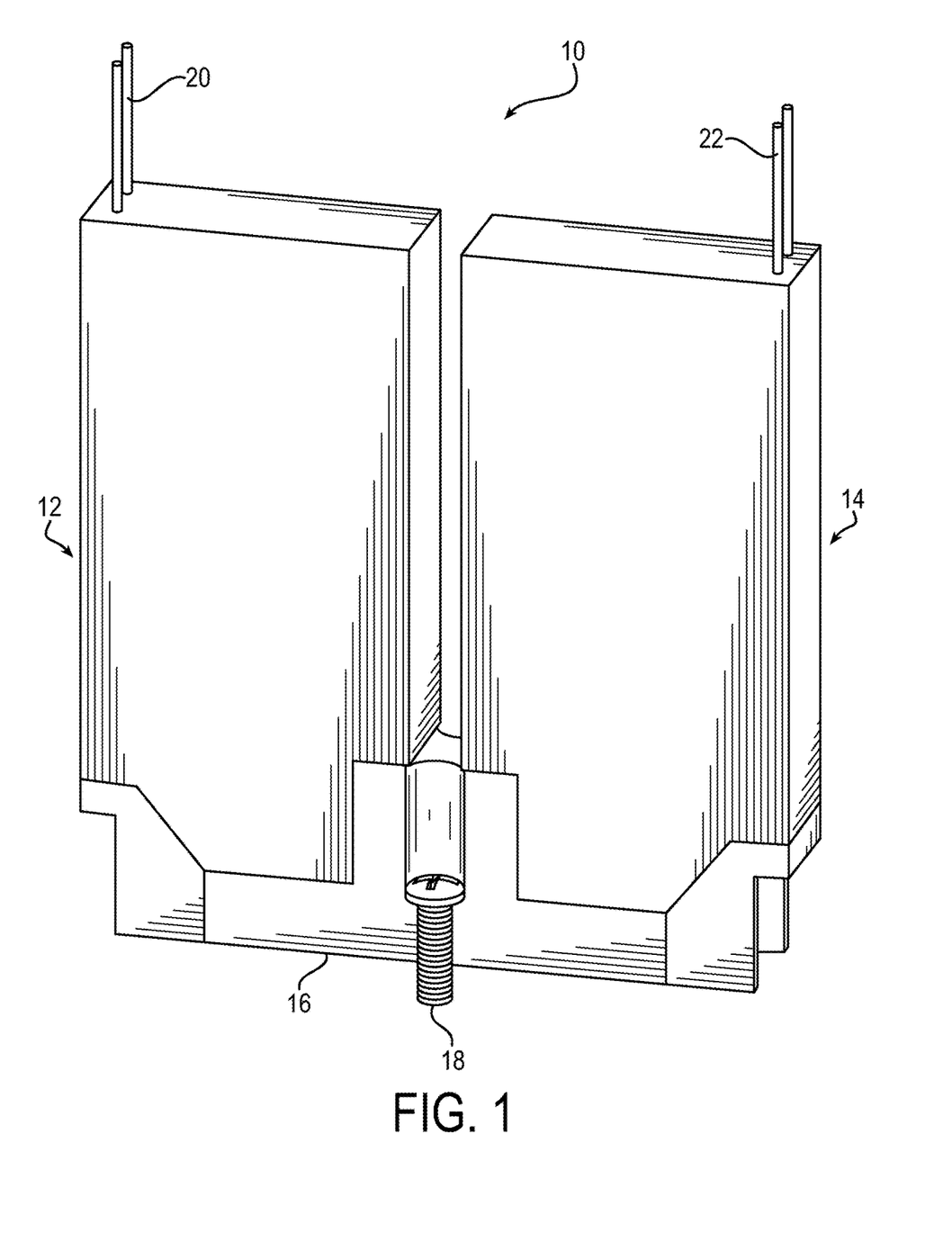
FIG. 1 is a drawing depicting an isometric view of an exemplary low profile miniature solenoid valve system in accordance with embodiments of the present invention.

FIG. 1 is a drawing depicting an isometric view of an exemplary low profile miniature solenoid valve system 10 in accordance with embodiments of the present invention. The valve system 10 may include a first solenoid valve component 12 and a second solenoid valve component 14. The individual solenoid valve components 12 and 14 may be mounted to a common valve body 16 to configure the system as a single manifold. The valve system 10 may include any suitable fastening element 18 for mounting the valve system to equipment in a manner suitable for valve operation. The mounting may provide for ready connection to fluid sources and drain passages as would be suitable for any particular application. The individual solenoid valve components 12 and 14 further each may include respective lead wiring 20 and 22 for energizing the solenoids of the respective first and second valve components.

Generally, an aspect of the invention is an enhanced solenoid valve system including a valve body defining porting for a fluid flow through the valve body; a first valve component attached to the valve body, the first valve component having a first poppet that is electromagnetically driven between a closed position and an open position; and a second valve component attached to the valve body, the second valve component having a second poppet that is electromagnetically driven between a closed position and an open position. In exemplary embodiments, the porting defined by the valve body includes first side porting, second side porting, and common porting that each are in fluid communication with an internal common chamber defined by the valve body. When the first poppet is in the closed position the first poppet is positioned to block a flow of fluid between the first side porting and the common porting, and when the first poppet is in the open position the first poppet is positioned to permit a flow of fluid between the first side porting and the common porting through the common chamber. When the second poppet is in the closed position the second poppet is positioned to block a flow of fluid between the second side porting and the common porting, and when the second poppet is in the open position the second poppet is positioned to permit a flow of fluid between the second side porting and the common porting through the common chamber.

Each of the first and second valve components may include a magnetic armature that drives the poppet between the closed position and the open position, and a solenoid coil that is housed within a soft magnetic frame. When the solenoid coil is energized, a magnetic field is created which causes the armature with the poppet to move between the closed position and the open position. Each of the first and second valve components also may include a latching mechanism that maintains the armature in a bistable manner in either of the first position or the second position. The latching mechanism may include a spring that biases the armature with the poppet in the closed position, and a permanent magnetic (PM) element that retains the armature with the poppet in the open position. Accordingly, in the closed position with the coil power turned off, the spring force may overcome the force exerted on the armature by the PM ring to force the armature with the poppet closed. In the open position with the coil power turned off, the force exerted on the armature by the PM ring may overcome the spring force to retain the armature with the poppet open.

Figure 2:
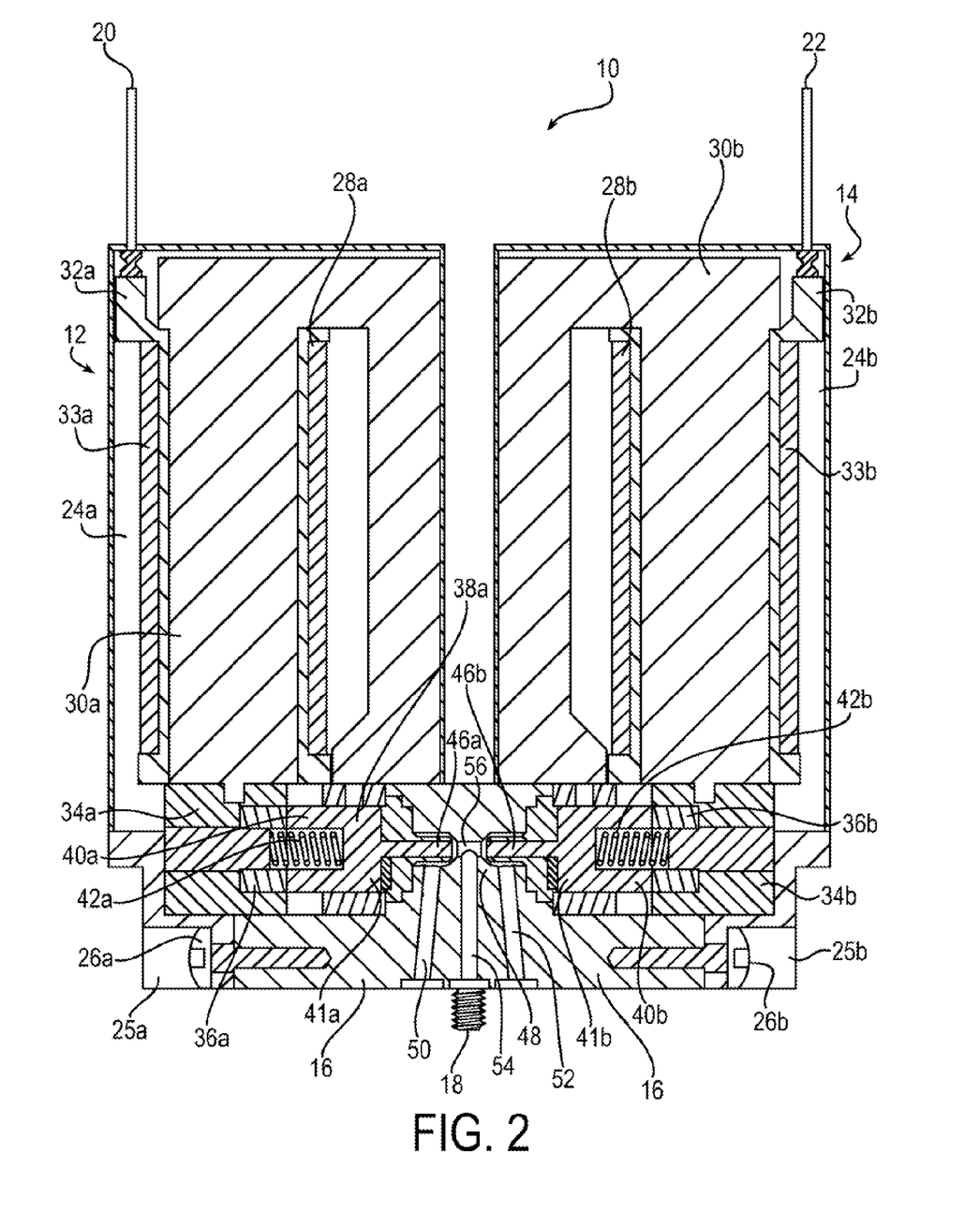
FIG. 2 is a drawing depicting a side cross-sectional view of the exemplary low profile miniature solenoid valve system of FIG. 1.

FIG. 2 is a drawing depicting a side cross-sectional view of the exemplary low profile miniature solenoid valve system 10 of FIG. 1. The first solenoid valve component 12 may be housed in an outer frame 24*a* that forms part of the common manifold as referenced above. Any suitable fastening element 26*a* (e.g., bolt, screw, or the like) may be used to fix the outer frame 24*a* to the common valve body 16, thereby mounting the first solenoid valve component 12 to the common valve body 16.

Figure 5:
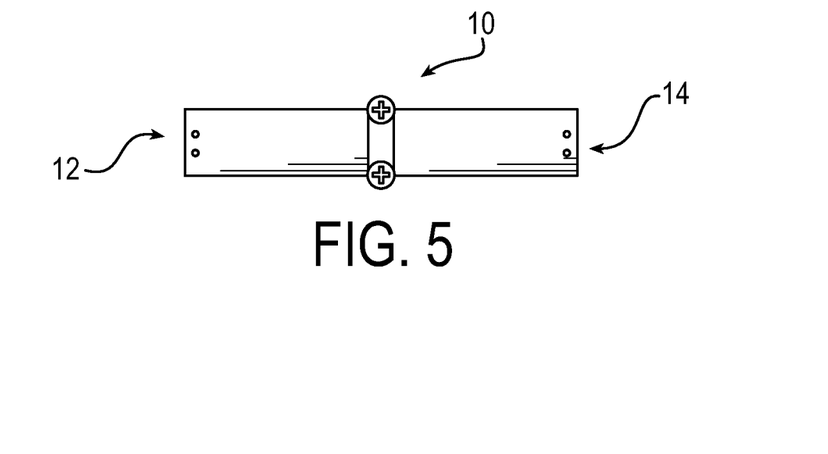
FIG. 5 is a drawing depicting a top view showing the dimensional profile of the low profile miniature solenoid valve system of FIG. 4.

Housed within the outer frame 24*a*, the first solenoid valve component 12 may include a solenoid coil 28*a* supported by a soft magnetic frame 30*a*. The soft magnetic frame 30*a* may be made of any suitable ferro-magnetic material as are known in the art for use in connection with solenoid valves. The coil 28*a* may be configured to have an oval cross-section to minimize the footprint of the first solenoid valve component 12. With an oval cross-section, a valve footprint of 9 mm or less along a minor or short axis direction of the oval cross-section may be readily achieved, which provides for a compact size most suitable for the requisite high pressures and flow rates used in typical applications. Referring briefly to FIG. 5, a top view is shown where such 9 mm minor or short axis direction is defined.

Figure 6:
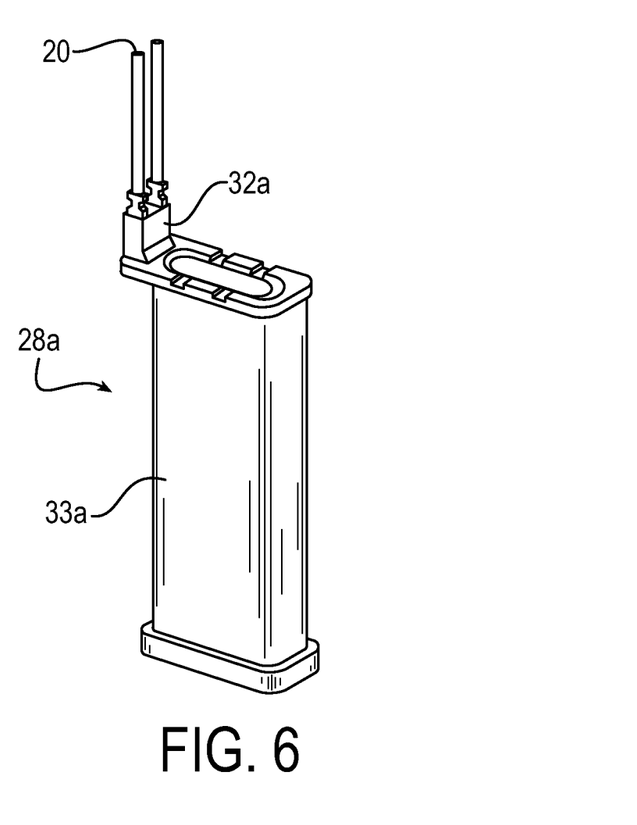
FIG. 6 is a drawing depicting an exemplary solenoid coil assembly for use in the low profile miniature solenoid valve system of FIGS. 1-5.

Referring briefly to FIG. 6 in combination with FIG. 2, an exemplary solenoid coil 28*a* is shown in isolation. The solenoid coil 28*a* may include a plastic bobbin 32*a* that provides a frame for winding a copper coil 33*a*. The lead wires 20 extend through the bobbin to provide connection to the copper wire 33*a*, which is then connected to a power source (not shown) via the lead wiring 20. FIG. 6 also identifies the short or minor axis, which as referenced above can have a dimension of 9 mm or less.

The first solenoid valve component 12 further may include an inner soft magnetic frame element 34*a* that houses a permanent magnetic (PM) element 36*a*. The PM element may be configured as a ring structure, and thus also may be referred to as a PM ring 36*a*. As further detailed below, the PM ring 36*a* operates as part of a latching mechanism that permits bistable operation of the first valve component 12, thereby obviating a need to maintain a constant power supply to retain the solenoid valve component in either the open position or the closed position.

The first solenoid valve component 12 further may include a magnetic armature 38*a* having a first end 40*a* and a second end 41*a* opposite from the first end 40*a*. The first end 40*a* may be attached to or otherwise in mechanical communication with a biasing spring 42*a*. The opposing second end 41*a* may have a poppet 46*a* configured as an elastomeric ring structure. Generally, the spring 42*a* biases the valve component into a closed position by biasing the poppet 46*a* against a central valve seat 48 formed by the common valve body 16.

Figure 4:
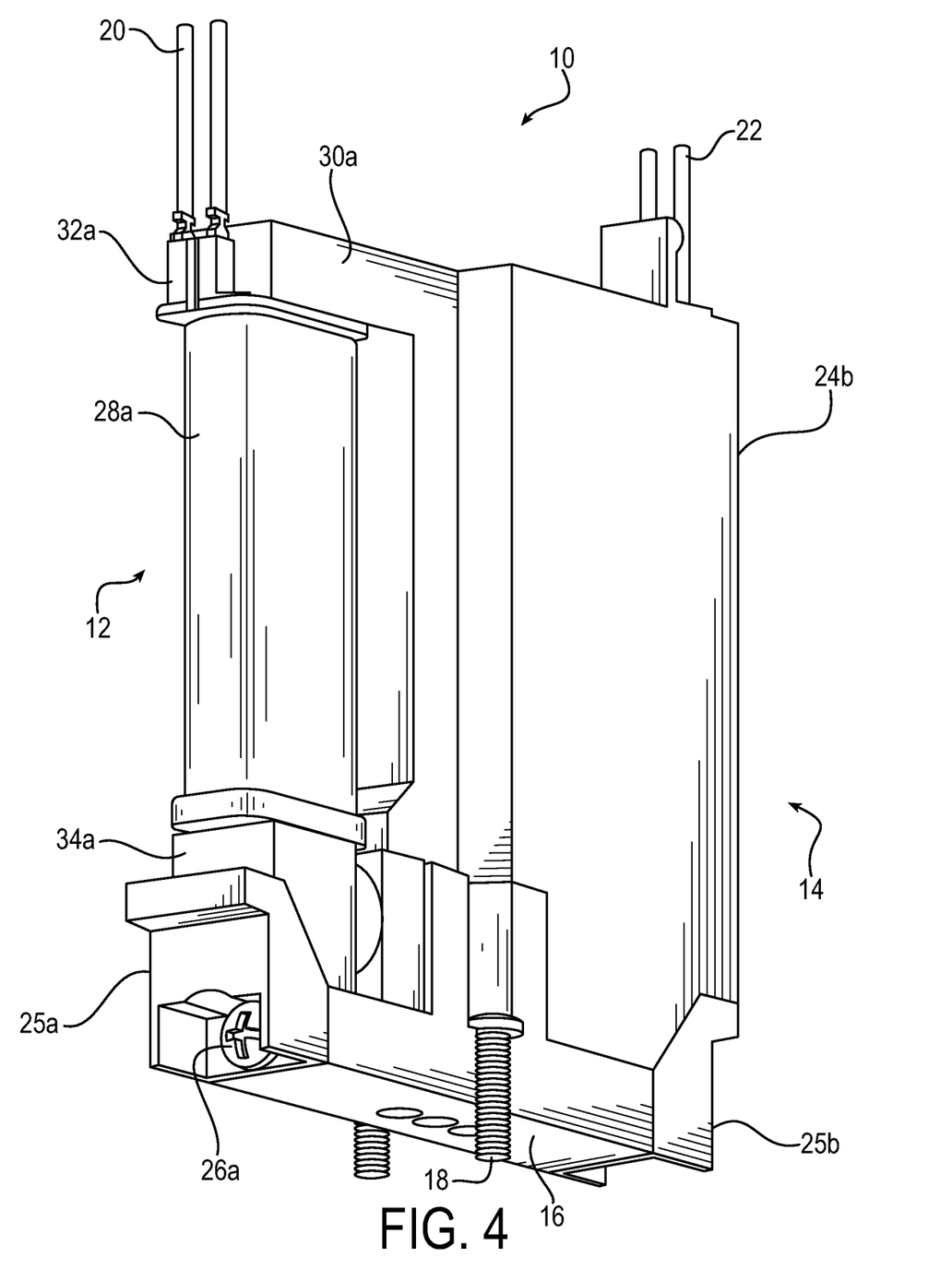
FIG. 4 is a drawing depicting an isometric cutaway view of the exemplary low profile miniature solenoid valve system of FIGS. 1-2.

Referring briefly to FIG. 4, FIG. 4 is a drawing depicting an isometric cutaway view of the exemplary low profile miniature solenoid valve system of FIGS. 1-2, with portions of the first solenoid valve component exposed. Accordingly, like reference numerals are used to identify like components in FIG. 4 as in FIGS. 1-2. The frame 24*b* (24*b* is used as pertaining to the second solenoid valve component 14) may be configured as a shell that bonds to the internal components. Opposing brackets 25*a* and 25*b* may be used to mount the valve system to other equipment.

Referring back to the cross-sectional view of FIG. 2, the second solenoid valve component 14 may be configured comparably as the first solenoid valve component 12. In exemplary embodiments, the first and second valve components are configured as mirror imaged opposing twin identical solenoid valve components. Accordingly, the second solenoid valve component 14 may be housed in an outer frame or shell 24*b* that forms part of the common manifold as referenced above. Any suitable fastening element 26*b* (e.g., bolt, screw, or the like) may be used to fix the outer frame 24*b* to the common valve body 16, thereby mounting the second solenoid valve component 14 to the valve body 16. The outer frames or shell 24*a* and 24*b*, and the common valve body 16, thus form a common manifold for mounting both the individual solenoid valve components in a combined valve system. A mounting bracket 25*b* may be provided as to the second valve component comparably as bracket 25*a* for the first valve component.

Housed within the outer frame 24*b*, the second solenoid valve component 14 may include a solenoid coil 28*b* supported by a soft magnetic frame 30*b*. As in the first solenoid valve component, the soft magnetic frame 30*b* may be made of any suitable ferro-magnetic material as are known in the art for use in connection with solenoid valves. The coil 28b also may be configured to have an oval cross-section to minimize the footprint of the first solenoid valve component 14, which again can readily achieve a valve footprint of 9 mm or less along the minor or short axis of the oval cross-section. The second solenoid coil 28b similarly may include a plastic bobbin 32b that provides a frame for winding a copper coil 33b. The lead wires 22 extend through the bobbin to provide connection to the copper wire 33b, which is then connected to a power source (not shown) via the lead wiring 22.

The second solenoid valve component 14 further may include an inner soft magnetic frame element 34b that houses a permanent magnetic (PM) element or PM ring 36b. Similarly as with the first solenoid valve component, as further detailed below, the PM ring 36b also operates as part of a latching mechanism that permits bistable operation of the second valve component 14, thereby obviating a need to maintain a constant power supply to retain the solenoid valve component in either the open position or the closed position.

The second solenoid valve component 14 further may include a magnetic armature 38b having a first end 40b and a second end 41b opposite from the first end 40b. The first end 40b may be attached to or otherwise in mechanical communication with a biasing spring 42b. The opposing second end 41b may have a poppet 46b configured as an elastomeric ring structure. Generally, the spring 42b biases the valve component into a closed position by biasing the poppet 46b against the central valve seat 48 of the common valve body 16.

Each of the solenoid valve components 12 and 14 may operate as follows. The armatures 38a/38b with poppets 46a/46b each are moveable between a closed position and an open position along a common longitudinal axis. With such common longitudinal axis, a small footprint is achieved.

In the closed position, the biasing springs 42a/42b operate to bias the poppets 46a/46b against opposing surfaces of the central valve seat 48 of the common valve body 16. To actuate the solenoid valve components so as to move the armatures to the open position, the coils 28a/28b may be energized by providing a current to said coils via the lead wiring 20 and 22. The solenoid valve components may be operated individually or independently from each other, i.e., energizing one of the solenoid valve components to open such valve component while retaining the other solenoid valve component closed.

When a coil 28a/28b is energized, magnetic flux lines loop through the various soft magnetic frame components into the magnetic armature 38a/38b. This in turn generates a magnetic force that moves the armature against the bias of the spring 42a/42b, thereby moving the poppet 46a/46b off of the valve seat 48 to open the solenoid valve component. As referenced above, each solenoid valve component operates in accordance with a latching mechanism that results in bistable switching between the closed and open positions. The springs 42a/42b bias the respective armatures to the closed position with the poppet against the valve seat, and the coils are energized to move the armatures to the open position.

Once in the open position, a respective PM ring 36a/36b by magnetic force retains the armatures in the open position without a need for continued supply of power. The PM-rings may be embedded in the soft magnetic frame components, and thus are configured as part of the coil magnetic flux loop. The magnetic pole axis of the PM-ring may be specified parallel to the magnetic flux in the coil frame, and the ring is designed close to the armature. To move the armatures back to the closed position against the magnetic force of the PM rings 36a/36b, the respective coil 28a/28b may be energized with a reverse current. Once an armature 38a/38b is back in the closed position, the power supply may be shut off, and the armatures again will be biased in the closed position with the poppet against the valve seat by the springs 42a/42b without a need for continued supply of power.

Accordingly, in the closed position with the coil power turned off, the spring force may overcome the force exerted on the armature by the PM ring to force the armature with the poppet closed. In the open position with the coil power turned off, the force exerted on the armature by the PM ring may overcome the spring force to retain the armature with the poppet open. The solenoid coil is energized with a current in a first direction to move the armature with the poppet from the closed position to the open position against the spring bias, and the solenoid is energized with a current in a second direction opposite from the first direction to move the armature with the poppet from the open position to the closed position against the magnetic force of the PM ring The bistable latching mechanism thus saves power over valve systems that lack such mechanism. The individual solenoid valve components also can be operated via a special valve driver to have different combination functions, e.g. a normally closed 3-way or two 2-way valves, singled sided operation, or the other combinations, since each solenoid valve component can be piloted independently.

Aspects of the present invention relate to enhanced porting for the 3-way solenoid valve system including the two individual solenoid valve components mounted in a common manifold as described above. Each individual solenoid valve component may operate to open and close a respective a flow passage, with each such individual flow passage having a fluid port in fluid communication with a common port though the 3-way valve system. With such porting, the present invention provides for a solenoid valve system with a compact size and footprint (e.g., 9 mm or less along the minor or short axis) that uniquely delivers enhanced carryover performance (i.e., low carryover time) in combination with high pressures and flow rates and with a 3-way way shutoff capability.

In exemplary embodiments, to achieve low-carryover performance a smaller internal chamber volume is designed, having minimal dead space in tubular flow passages as compared to conventional configurations. Referring to FIG. 2 as an exemplary configuration, the valve body 16 may define first side flow porting 50 and second side flow porting 52. The first side porting 50 is closed or open based upon whether the respective armature 38a with poppet 46a is in the closed or open position. Similarly, the second side flow porting 52 is closed or open based upon whether the respective armature 38b with poppet 46b is in the closed or open position. The valve body 16 further may define common porting 54. The various flow passages may be configured as tubular flow passages to minimize flow restrictions. The first and second side porting may be in fluid communication with the common porting via an internal common chamber 56 when the valve components are in the open position. In this manner, the common chamber is located centrally within the valve body, with the first and second side porting being on opposite sides of the common porting. As used herein, therefore, the term "common chamber" may include the intersection area of under seat volumes of the first and second side porting and the common porting. As referenced above, the armatures move along a common longitudinal axis with the poppets extending into the common chamber from opposing sides of the common porting.

The described configuration provides for a minimal footprint, in which the poppets are in close proximity centrally within the valve body on opposite sides of the common porting in the area of the common chamber. In this manner, the volume of the internal common chamber is minimized. This reduces the dead space for fluid build-up, and renders the valve body and common porting readily flushable with minimal fluid usage as compared to conventional configurations. This in turn enhances carryover performance (i.e., reduces carryover time) over conventional configurations.

Figure 3:
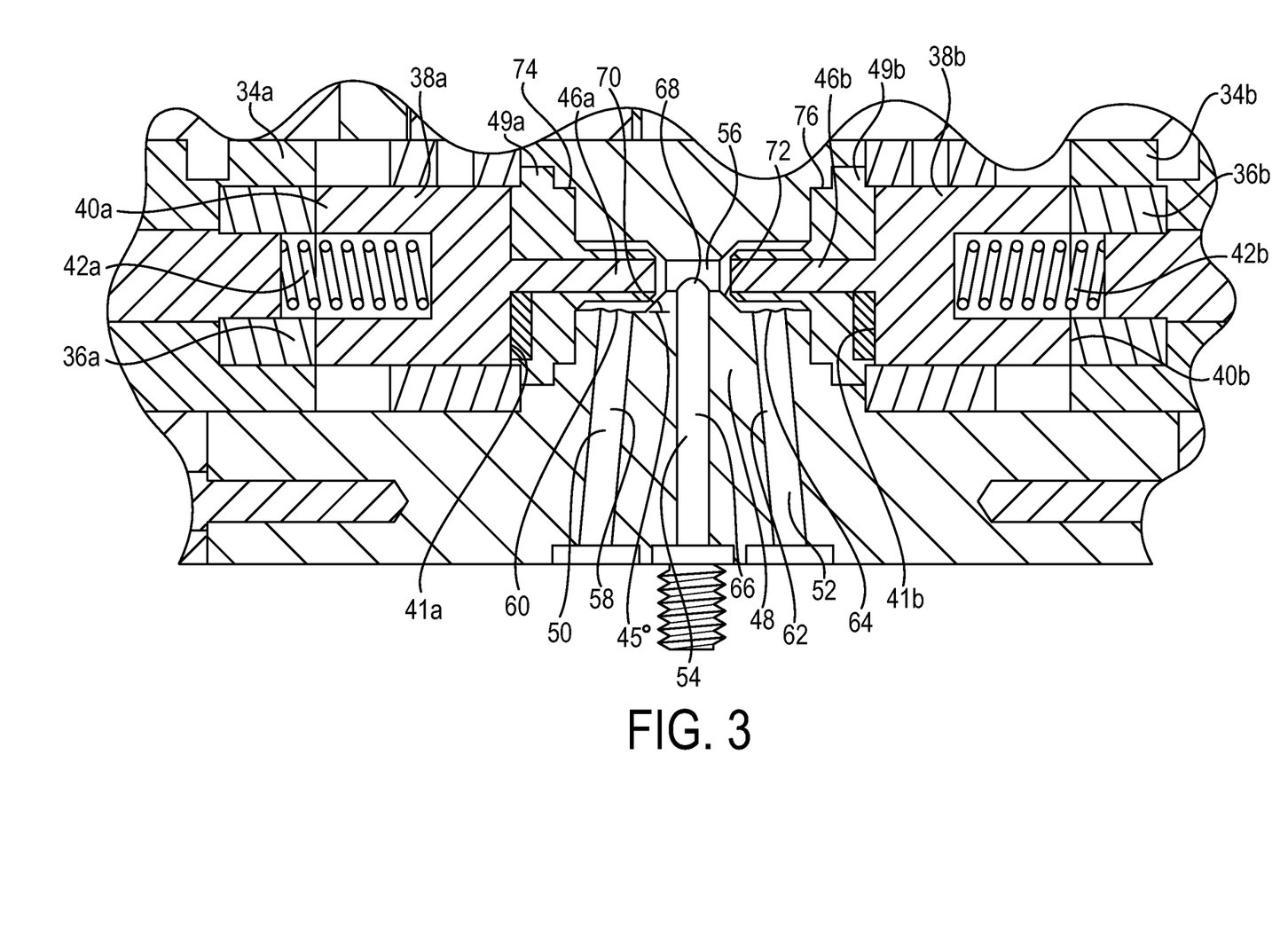
FIG. 3 is a drawing depicting a close-up view of a portion of the exemplary low profile miniature solenoid valve system of FIG. 2, showing the porting configuration through the valve system.

FIG. 3 is a drawing depicting a close-up view of a portion of the exemplary low profile miniature solenoid valve system of FIG. 2, showing the porting configuration through the valve system. Accordingly, like reference numerals are used in FIG. 3 for like components shown in FIG. 2. Generally, the valve body includes the central valve seat 48 that extends into the common chamber 56. In the closed position of the first poppet 46a, the first poppet 46a interacts against the central valve seat 48 to block a flow of fluid between the first side porting 50 and the common porting 54. In the closed position of the second poppet 46b, the second poppet 46b interacts against the central valve seat 48 to block a flow of fluid between the second side porting 52 and the common porting 54.

In exemplary embodiments, the first side porting 50 defined by the valve body 16 may include a first side flow passage 58 that ends in a first side port 60 that opens into the common chamber 56. The first side port 60 is closed or open relative to the common porting based upon whether the respective armature 38a with poppet 46a is in the closed or open position. Similarly, second side porting 52 defined by the valve body 16 may include a second side flow passage 62 that ends in a second side port 64 that opens into the common chamber 56. The second side port 64 is closed or open relative to the common porting based upon whether the respective armature 38b with poppet 46b is in the closed or open position. The common porting 54 defined by the valve body 16 may include a common flow passage 66 that ends in a common port 68 that opens into the common chamber 56. In this manner, the side ports 60 and 64, and the common port 68, all open to the internal common chamber 56.

In an example of operation, when the first solenoid valve component is open, i.e., the first armature 38a with poppet 46a is in the open position, flow may proceed through the internal common chamber 56 between the first side port 60 and the common port 68. Similarly, when the second solenoid valve component is open, i.e., the second first armature 38b with poppet 46b is in the open position, flow may proceed through the internal common chamber 56 between the second side port 64 and the common port 68. Conversely, when the first solenoid valve component is closed, i.e., the first armature 38a with poppet 46a is in the closed position, flow is blocked by the poppet and valve seat from proceeding between the first side port 60 and the common port 68. Similarly, when the second solenoid valve component is closed, i.e., the second armature 38b with poppet 46b is in the closed position, flow is blocked by the poppet and valve seat from proceeding between the second side port 64 and the common port 68. The direction of flow may proceed in any direction as suitable for any particular application. The common passage and port may be an inlet, with the first and second side passages and ports being the outlet, or vice versa. In addition, the first valve component and the second valve component are operable independently so as to maintain one of the poppets in the open position with the other of the poppets in the closed position.

The configuration of the present invention achieves a smaller internal volume in the common chamber 56 as compared to conventional configurations, and thus the tubular flow passages have minimal pockets and cavities that could act as dead spaces for residual fluid build-up. For a 3-way valve system, the three ports including the two side ports 60 and 64 and common port 68 may meet generally in the area of the common chamber 56 at a center of the common valve body 16 that links the individual solenoid valve components. The two poppet seals 46a and 46b likewise are close to the center of the 3-valve system in the area of the common chamber 56. With this exemplary configuration, the common chamber 56 may be configured as having generally a "T" shaped geometry as shown in FIGS. 2 and 3.

Commensurately, for one of the open solenoid valve components with a respective one of the first or second poppets in the open position, an intersection of a respective open side flow passage and the common passage is configured nearly as an "L" shaped geometry when the other of the respective first or second poppets is in the closed position. Such configuration dramatically reduces dead volume, and residual fluid in the common chamber is minimized and can be very easily flushed out as required when switching different fluids and/or different flow directions. Example flow switching may include first side port→common port to second side port→common port; or common port→first side port to common port→second side port (and reverse of those). For a 2-way valve operation, which basically is one of the individual solenoid valve components open and the other of the individual solenoid valve components closed, when a respective one of the first or second poppets is in the open position, a flow passage through a respective open side passage, the common chamber, and the common passage has a bended shaped geometry when the other of the respective first or second poppets is in the closed position. This shape also reduces dead space to enhance the ability to flush the whole common chamber cleanly, which in turn further enhances carryover performance (i.e., reduces carryover time) over conventional configurations.

In exemplary embodiments, as shown for example in FIG. 3, the first solenoid valve component is closed when the poppet 46a is forced by the spring 42a to interact against the central valve seat 48, and particularly interact against a first valve seat surface 70. Commensurately, the second solenoid valve component is closed when the poppet 46b is forced by the spring 42b to interact against the central valve seat 48, and particularly interact against an opposing second valve seat surface 72. The first valve seat surface 70 may extend from the first side port 60 to the common port 68, and the opposing second valve seat surface 72 may extend from the second side port 64 to the common port 68. In this manner, the opposing valve seat surfaces 70 and 72 may form a cone shape, with the first valve seat surface 70 and the second valve seat surface 72 being opposing surfaces relative to an apex of the cone shape. The valve seat surfaces may be inclined at approximately a 45° angle (see angle shown in FIG. 3) relative to the longitudinal axis of movement of the armatures. This configuration also permits the poppets to be as close as practicable to the porting intersection at the common chamber.

As also seen in FIG. 3, the valve body 16 may have opposing secondary valve seats 74 and 76. The secondary valve seats may be configured to conform to an external surface of poppet bases 49a and 49b. In an exemplary embodiment shown in FIG. 3, the secondary valve seats may be stepped so as to receive commensurately stepped surfaces of the poppet bases. The interaction of the secondary valve seats and the poppet bases provides an enhanced sealing effect when the poppets are in the closed position.

As aspect of the invention, therefore, is an enhanced solenoid valve system having a compact footprint and enhanced carryover performance. In exemplary embodiments, the solenoid valve system may include a valve body defining porting for a fluid flow through the valve body, a first valve component attached to the valve body, the first valve component having a first poppet that is electromagnetically driven between a closed position and an open position, and a second valve component attached to the valve body, the second valve component having a second poppet that is electromagnetically driven between a closed position and an open position. The porting defined by the valve body includes first side porting, second side porting, and common porting that each are in fluid communication with an internal common chamber defined by the valve body. When the first poppet is in the closed position the first poppet is positioned to block a flow of fluid between the first side porting and the common porting, and when the first poppet is in the open position the first poppet is positioned to permit a flow of fluid between the first side porting and the common porting through the common chamber. When the second poppet is in the closed position the second poppet is positioned to block a flow of fluid between the second side porting and the common porting, and when the second poppet is in the open position the second poppet is positioned to permit a flow of fluid between the second side porting and the common porting through the common chamber. The solenoid valve system may include one or more of the following features, either individually or in combination.

In an exemplary embodiment of the solenoid valve system, the first and second poppets move between the open and closed positions along a common longitudinal axis.

In an exemplary embodiment of the solenoid valve system, the first side porting includes a first side flow passage that ends in a first side port that opens into the common chamber; the second side porting includes a second side flow passage that ends in a second side port that opens into the common chamber; and the common porting includes a common flow passage that ends in a common port that opens into the common chamber.

In an exemplary embodiment of the solenoid valve system, when a respective one of the first or second poppets is in the open position, an intersection of a respective open side passage and the common passage has an L-shaped geometry when the other of the respective first or second poppets is in the closed position.

In an exemplary embodiment of the solenoid valve system, when a respective one of the first or second poppets is in the open position, a flow passage through a respective open side passage, the common chamber, and the common passage has a bended "Π"-shaped geometry when the other of the respective first or second poppets is in the closed position.

In an exemplary embodiment of the solenoid valve system, the first side passage, the second side passage, and the common passage are tubular passages.

In an exemplary embodiment of the solenoid valve system, the common chamber has a T-shaped geometry.

In an exemplary embodiment of the solenoid valve system, the common chamber is located centrally within the valve body, with the first and second side porting being on opposite sides of the common porting.

In an exemplary embodiment of the solenoid valve system, the valve body includes a central valve seat that extends into the common chamber. In the closed position of the first poppet the first poppet interacts against the central valve seat to block a flow of fluid between the first side porting and the common porting; and in the closed position of the second poppet the second poppet interacts against the central valve seat to block a flow of fluid between the second side porting and the common porting.

In an exemplary embodiment of the solenoid valve system, the central valve seat has a cone shape.

In an exemplary embodiment of the solenoid valve system, in the closed position of the first poppet the first poppet interacts against a first surface of the valve seat; in the closed position of the second poppet the second poppet interacts against a second surface of the valve seat; and the first and second surfaces of the valve seat are opposing surfaces relative to an apex of the cone shape.

In an exemplary embodiment of the solenoid valve system, the first and second surfaces of the valve seat are inclined at about a 45° relative to a longitudinal axis of the poppets.

In an exemplary embodiment of the solenoid valve system, the first surface of the valve seat extends from the first side porting to the common porting, and the second surface of the valve seat extends from the second side porting to the common porting.

In an exemplary embodiment of the solenoid valve system, the valve body further comprises secondary valve seats, and bases of the first and second poppets interact against the secondary valve seats when in the closed position.

In an exemplary embodiment of the solenoid valve system, the secondary valve seats are stepped and the poppet bases are stepped commensurately with the secondary valve seats.

In an exemplary embodiment of the solenoid valve system, each of the first and second valve components comprises: a magnetic armature that drives the poppet between the closed position and the open position; and a solenoid coil that is housed within a soft magnetic frame; wherein when the solenoid coil is energized, a magnetic field is created which causes the armature with the poppet to move between the closed position and the open position.

In an exemplary embodiment of the solenoid valve system, each of the first and second valve components includes a latching mechanism that maintains the armature in a bistable manner in either of the closed position or the open position.

In an exemplary embodiment of the solenoid valve system, the latching mechanism includes a spring that biases the armature with the poppet in the closed position.

In an exemplary embodiment of the solenoid valve system, the latching mechanism further includes a permanent magnetic (PM) element that retains the armature with the poppet in the open position.

In an exemplary embodiment of the solenoid valve system, the solenoid is energized with a current in a first direction to move the armature with the poppet from the closed position to the open position against the spring bias, and the solenoid is energized with a current in a second direction opposite from the first direction to move the armature with the poppet from the open position to the closed position against the magnetic force of the PM element.

In an exemplary embodiment of the solenoid valve system, the solenoid coils have an oval cross-section.

In an exemplary embodiment of the solenoid valve system, the first and second valve components each has a footprint of 9 mm or less along a short axis of the oval cross-section of the coil.

In an exemplary embodiment of the solenoid valve system, the valve body and outer frames of the first and second valve components form a common manifold for the first and second valve components.

In an exemplary embodiment of the solenoid valve system, the first valve component and the second valve component are operable independently so as to maintain one of the poppets in the open position with the other of the poppets in the closed position.

In an exemplary embodiment of the solenoid valve system, the first and second valve components are configured as mirror imaged opposing twin identical solenoid valve components.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solenoid valve system comprising:
   a valve body defining porting for a fluid flow through the valve body;
   a first valve component attached to the valve body, the first valve component having a first poppet that is electromagnetically driven between a closed position and an open position along a longitudinal axis;
   a second valve component attached to the valve body, the second valve component having a second poppet that is electromagnetically driven between a closed position and an open position along the longitudinal axis; and
   a central valve seat that extends into an internal common chamber defined by the valve body, the central valve seat including a first valve seat surface and an opposing second valve seat surface, wherein:
   the porting defined by the valve body includes first side porting including a first side flow passage that ends in a first side port that opens into an internal common chamber defined by the valve body, second side porting including a second side flow passage that ends in a second side port that opens into the common chamber, and common porting including a common flow passage that ends in a common port that opens into the common chamber, such that each of the first side porting, the second side porting and the common porting are in fluid communication with the common chamber, wherein the first side porting and the second side porting are configured for fluid flow in a direction transverse to the longitudinal axis;
   the first valve seat surface extends from the first side port to the common port, and the opposing second valve seat surface extends from the second side port to the common port;
   when the first poppet is in the closed position the first poppet is positioned to interact against the first valve seat surface of the central valve seat to block a flow of fluid between the first side porting and the common porting, and when the first poppet is in the open position the first poppet is positioned to permit a flow of fluid between the first side porting and the common porting through the common chamber; and
   when the second poppet is in the closed position the second poppet is positioned to interact against the second valve seat surface of the central valve seat to block a flow of fluid between the second side porting and the common porting; and when the second poppet is in the open position the second poppet is positioned to permit a flow of fluid between the second side porting and the common porting through the common chamber.

2. The solenoid valve system of claim 1, wherein when a respective one of the first or second poppets is in the open position, an intersection of a respective open side passage and the common passage has an L-shaped geometry when the other of the respective first or second poppets is in the closed position.

3. The solenoid valve system of claim 1, wherein when a respective one of the first or second poppets is in the open position, a flow passage through a respective open side passage, the common chamber, and the common passage has a bended "n" shaped geometry when the other of the respective first or second poppets is in the closed position.

4. The solenoid valve system of claim 1, wherein the first side passage, the second side passage, and the common passage are tubular passages.

5. The solenoid valve system of claim 1, wherein the first side port, the second side port and the common chamber together form a T-shaped geometry.

6. The solenoid valve system of claim 1, wherein the common chamber is located centrally within the valve body, with the first and second side porting being on opposite sides of the common porting.

7. The solenoid valve system of claim 1, wherein each of the first and second valve components comprises:
   a magnetic armature that drives the poppet between the closed position and the open position; and
   a solenoid coil that is housed within a soft magnetic frame;
   wherein when the solenoid coil is energized, a magnetic field is created which causes the armature with the poppet to move between the closed position and the open position.

8. The solenoid valve system of claim 7, wherein each of the first and second valve components includes a latching mechanism that maintains the armature in a bistable manner in either of the closed position or the open position.

9. The solenoid valve system of claim 8, wherein the latching mechanism includes a spring that biases the armature with the poppet in the closed position.

10. The solenoid valve system of claim 9, wherein the latching mechanism further includes a permanent magnetic (PM) element that retains the armature with the poppet in the open position.

11. The solenoid valve system of claim 10, wherein the solenoid is energized with a current in a first direction to move the armature with the poppet from the closed position to the open position against the spring bias, and the solenoid is energized with a current in a second direction opposite from the first direction to move the armature with the poppet from the open position to the closed position against the magnetic force of the PM element.

12. The solenoid valve system of claim 1, wherein the solenoid coils have an oval cross-section.

13. The solenoid valve system of claim 1, wherein the first and second valve components are housed in a first and second outer frame, respectively, and wherein the valve body and outer frames of the first and second valve components form a common manifold for the first and second valve components.

14. The solenoid valve system of claim 1, wherein the first and second valve components are configured as mirror imaged opposing twin identical solenoid valve components.

* * * * *